United States Patent
Laroche et al.

(10) Patent No.: US 9,558,755 B1
(45) Date of Patent: Jan. 31, 2017

(54) NOISE SUPPRESSION ASSISTED AUTOMATIC SPEECH RECOGNITION

(75) Inventors: Jean Laroche, Santa Cruz, CA (US); Carlo Murgia, Sunnyvale, CA (US)

(73) Assignee: Knowles Electronics, LLC, Itasca, IL (US)

( * ) Notice: Subject to any disclaimer, the term of this patent is extended or adjusted under 35 U.S.C. 154(b) by 1107 days.

(21) Appl. No.: 12/962,519

(22) Filed: Dec. 7, 2010

Related U.S. Application Data (60) Provisional application No. 61/346,851, filed on May 20, 2010.

(51) Int. Cl.
*G10L 21/02* (2013.01)
*G10L 21/00* (2013.01)

(52) U.S. Cl.
CPC ............. *G10L 21/02* (2013.01); *G10L 21/00* (2013.01)

(58) Field of Classification Search
USPC ............. 704/200–200.1, 227–229, 500–504, 704/E19.001–E19.049, E21.001–E21.02; 381/71.1–71.14, 94.1–94.9
See application file for complete search history.

(56) References Cited

U.S. PATENT DOCUMENTS

| | | |
|---|---|---|
| 4,025,724 A | 5/1977 | Davidson, Jr. et al. |
| 4,630,304 A | 12/1986 | Borth et al. |
| 4,802,227 A | 1/1989 | Elko et al. |
| 4,969,203 A | 11/1990 | Herman |
| 5,115,404 A | 5/1992 | Lo et al. |
| 5,289,273 A | 2/1994 | Lang |
| 5,400,409 A | 3/1995 | Linhard |
| 5,406,635 A | 4/1995 | Jarvinen |
| 5,546,458 A | 8/1996 | Iwami |
| 5,550,924 A | 8/1996 | Helf et al. |
| 5,555,306 A | 9/1996 | Gerzon |
| 5,625,697 A | 4/1997 | Bowen et al. |
| 5,706,395 A | 1/1998 | Arslan et al. |
| 5,715,319 A | 2/1998 | Chu |
| 5,734,713 A | 3/1998 | Mauney et al. |

(Continued)

FOREIGN PATENT DOCUMENTS

| | | |
|---|---|---|
| EP | 0756437 A2 | 1/1997 |
| EP | 1232496 A1 | 8/2002 |

(Continued)

OTHER PUBLICATIONS

Non-Final Office Action, Aug. 18, 2010, U.S. Appl. No. 11/825,563, filed Jul. 6, 2007.

(Continued)

*Primary Examiner* — Pierre-Louis Desir
*Assistant Examiner* — David Kovacek
(74) *Attorney, Agent, or Firm* — Foley & Lardner LLP (57) ABSTRACT

Noise suppression information is used to optimize or improve automatic speech recognition performed for a signal. Noise suppression can be performed on a noisy speech signal using a gain value. The gain to apply to the noisy speech signal is selected to optimize speech recognition analysis of the resulting signal. The gain may be selected based on one or more features for a current sub band and time frame, as well as one or more features for other sub bands and/or time frames. Noise suppression information can be provided to a speech recognition module to improve the robustness of the speech recognition analysis. Noise suppression information can also be used to encode and identify speech.

14 Claims, 6 Drawing Sheets

(56) References Cited

U.S. PATENT DOCUMENTS

| | | | |
|---|---|---|---|
| 5,754,665 A | 5/1998 | Hosoi | |
| 5,774,837 A * | 6/1998 | Yeldener et al. | 704/208 |
| 5,806,025 A | 9/1998 | Vis et al. | |
| 5,819,215 A * | 10/1998 | Dobson et al. | 704/230 |
| 5,839,101 A | 11/1998 | Vahatalo et al. | |
| 5,905,969 A * | 5/1999 | Mokbel | G10L 15/065 |
| | | | 704/201 |
| 5,917,921 A | 6/1999 | Sasaki et al. | |
| 5,943,429 A | 8/1999 | Handel | |
| 5,978,824 A | 11/1999 | Ikeda | |
| 5,991,385 A | 11/1999 | Dunn et al. | |
| 6,011,853 A | 1/2000 | Koski et al. | |
| 6,035,177 A | 3/2000 | Moses et al. | |
| 6,065,883 A | 5/2000 | Herring et al. | |
| 6,084,916 A | 7/2000 | Ott | |
| 6,098,038 A | 8/2000 | Hermansky et al. | |
| 6,122,384 A | 9/2000 | Mauro | |
| 6,122,610 A | 9/2000 | Isabelle | |
| 6,144,937 A * | 11/2000 | Ali | 704/233 |
| 6,188,769 B1 | 2/2001 | Jot et al. | |
| 6,205,421 B1 | 3/2001 | Morii | |
| 6,219,408 B1 | 4/2001 | Kurth | |
| 6,263,307 B1 | 7/2001 | Arslan et al. | |
| 6,266,633 B1 | 7/2001 | Higgins et al. | |
| 6,281,749 B1 | 8/2001 | Klayman et al. | |
| 6,327,370 B1 | 12/2001 | Killion et al. | |
| 6,339,706 B1 | 1/2002 | Tillgren et al. | |
| 6,339,758 B1 | 1/2002 | Kanazawa et al. | |
| 6,343,267 B1 | 1/2002 | Kuhn et al. | |
| 6,381,284 B1 | 4/2002 | Strizhevskiy | |
| 6,381,469 B1 | 4/2002 | Wojick | |
| 6,389,142 B1 | 5/2002 | Hagen et al. | |
| 6,411,930 B1 | 6/2002 | Burges | |
| 6,424,938 B1 | 7/2002 | Johansson et al. | |
| 6,449,586 B1 | 9/2002 | Hoshuyama | |
| 6,453,284 B1 | 9/2002 | Paschall | |
| 6,480,610 B1 * | 11/2002 | Fang et al. | 381/321 |
| 6,487,257 B1 | 11/2002 | Gustafsson et al. | |
| 6,504,926 B1 | 1/2003 | Edelson et al. | |
| 6,526,140 B1 | 2/2003 | Marchok et al. | |
| 6,615,170 B1 | 9/2003 | Liu et al. | |
| 6,717,991 B1 | 4/2004 | Gustafsson et al. | |
| 6,738,482 B1 | 5/2004 | Jaber | |
| 6,745,155 B1 | 6/2004 | Andringa et al. | |
| 6,748,095 B1 | 6/2004 | Goss | |
| 6,751,588 B1 * | 6/2004 | Menendez-Pidal | G10L 15/065 |
| | | | 704/226 |
| 6,768,979 B1 * | 7/2004 | Menendez-Pidal | F16J 15/43 |
| | | | 704/226 |
| 6,778,954 B1 | 8/2004 | Kim et al. | |
| 6,782,363 B2 | 8/2004 | Lee et al. | |
| 6,804,651 B2 | 10/2004 | Juric et al. | |
| 6,810,273 B1 | 10/2004 | Mattila et al. | |
| 6,873,837 B1 | 3/2005 | Yoshioka et al. | |
| 6,882,736 B2 | 4/2005 | Dickel et al. | |
| 6,931,123 B1 | 8/2005 | Hughes | |
| 6,980,528 B1 | 12/2005 | LeBlanc et al. | |
| 7,006,881 B1 * | 2/2006 | Hoffberg | G05B 15/02 |
| | | | 700/17 |
| 7,010,134 B2 | 3/2006 | Jensen | |
| 7,020,605 B2 | 3/2006 | Gao | |
| RE39,080 E * | 4/2006 | Johnston | 704/200.1 |
| 7,035,666 B2 | 4/2006 | Silberfenig et al. | |
| 7,054,808 B2 | 5/2006 | Yoshida | |
| 7,058,572 B1 * | 6/2006 | Nemer | 704/226 |
| 7,065,486 B1 | 6/2006 | Thyssen | |
| 7,072,834 B2 | 7/2006 | Zhou | |
| 7,092,529 B2 | 8/2006 | Yu et al. | |
| 7,092,882 B2 | 8/2006 | Arrowood et al. | |
| 7,103,176 B2 | 9/2006 | Rodriguez et al. | |
| 7,110,554 B2 | 9/2006 | Brennan et al. | |
| 7,127,072 B2 | 10/2006 | Rademacher et al. | |
| 7,145,710 B2 | 12/2006 | Holmes | |
| 7,146,013 B1 | 12/2006 | Saito et al. | |
| 7,165,026 B2 | 1/2007 | Acero et al. | |
| 7,171,246 B2 | 1/2007 | Mattila et al. | |
| 7,190,775 B2 | 3/2007 | Rambo | |
| 7,209,567 B1 | 4/2007 | Kozel et al. | |
| 7,221,622 B2 | 5/2007 | Matsuo et al. | |
| 7,225,001 B1 | 5/2007 | Eriksson et al. | |
| 7,245,710 B1 | 7/2007 | Hughes | |
| 7,245,767 B2 | 7/2007 | Moreno et al. | |
| 7,254,535 B2 | 8/2007 | Kushner et al. | |
| 7,289,955 B2 | 10/2007 | Deng et al. | |
| 7,327,985 B2 | 2/2008 | Morfitt, III et al. | |
| 7,359,520 B2 | 4/2008 | Brennan et al. | |
| 7,376,558 B2 | 5/2008 | Gemello et al. | |
| 7,383,179 B2 | 6/2008 | Alves et al. | |
| 7,447,631 B2 | 11/2008 | Truman et al. | |
| 7,469,208 B1 | 12/2008 | Kincaid | |
| 7,516,067 B2 | 4/2009 | Seltzer et al. | |
| 7,548,791 B1 | 6/2009 | Johnston | |
| 7,562,140 B2 | 7/2009 | Clemm et al. | |
| 7,574,352 B2 | 8/2009 | Quatieri, Jr. | |
| 7,617,282 B2 | 11/2009 | Han | |
| 7,657,038 B2 | 2/2010 | Doclo et al. | |
| 7,664,495 B1 | 2/2010 | Bonner et al. | |
| 7,664,640 B2 | 2/2010 | Webber | |
| 7,685,132 B2 | 3/2010 | Hyman | |
| 7,725,314 B2 | 5/2010 | Wu et al. | |
| 7,773,741 B1 | 8/2010 | LeBlanc et al. | |
| 7,791,508 B2 | 9/2010 | Wegener | |
| 7,796,978 B2 | 9/2010 | Jones et al. | |
| 7,895,036 B2 | 2/2011 | Hetherington et al. | |
| 7,899,565 B1 | 3/2011 | Johnston | |
| 7,925,502 B2 | 4/2011 | Droppo et al. | |
| 7,970,123 B2 | 6/2011 | Beaucoup | |
| 8,032,364 B1 | 10/2011 | Watts | |
| 8,036,767 B2 | 10/2011 | Soulodre | |
| 8,046,219 B2 | 10/2011 | Zurek et al. | |
| 8,081,878 B1 | 12/2011 | Zhang et al. | |
| 8,107,656 B2 | 1/2012 | Dreßler et al. | |
| 8,126,159 B2 | 2/2012 | Goose et al. | |
| 8,140,331 B2 | 3/2012 | Lou | |
| 8,143,620 B1 | 3/2012 | Malinowski et al. | |
| 8,155,953 B2 | 4/2012 | Park et al. | |
| 8,175,291 B2 * | 5/2012 | Chan et al. | 381/94.7 |
| 8,189,429 B2 | 5/2012 | Chen et al. | |
| 8,194,880 B2 | 6/2012 | Avendano | |
| 8,194,882 B2 | 6/2012 | Every et al. | |
| 8,204,252 B1 | 6/2012 | Avendano | |
| 8,204,253 B1 | 6/2012 | Solbach | |
| 8,223,988 B2 | 7/2012 | Wang et al. | |
| 8,229,137 B2 | 7/2012 | Romesburg | |
| 8,280,731 B2 | 10/2012 | Yu | |
| 8,345,890 B2 | 1/2013 | Avendano et al. | |
| 8,359,195 B2 | 1/2013 | Li | |
| 8,363,823 B1 | 1/2013 | Santos | |
| 8,363,850 B2 | 1/2013 | Amada | |
| 8,369,973 B2 | 2/2013 | Risbo | |
| 8,447,596 B2 | 5/2013 | Avendano et al. | |
| 8,467,891 B2 | 6/2013 | Huang et al. | |
| 8,473,285 B2 | 6/2013 | Every et al. | |
| 8,494,193 B2 | 7/2013 | Zhang et al. | |
| 8,531,286 B2 | 9/2013 | Friar et al. | |
| 8,538,035 B2 | 9/2013 | Every et al. | |
| 8,606,249 B1 | 12/2013 | Goodwin | |
| 8,615,392 B1 | 12/2013 | Goodwin | |
| 8,615,394 B1 | 12/2013 | Avendano et al. | |
| 8,639,516 B2 | 1/2014 | Lindahl et al. | |
| 8,682,006 B1 | 3/2014 | Laroche et al. | |
| 8,694,310 B2 | 4/2014 | Taylor | |
| 8,705,759 B2 * | 4/2014 | Wolff et al. | 381/66 |
| 8,718,290 B2 | 5/2014 | Murgia et al. | |
| 8,744,844 B2 | 6/2014 | Klein | |
| 8,750,526 B1 | 6/2014 | Santos et al. | |
| 8,762,144 B2 | 6/2014 | Cho et al. | |
| 8,774,423 B1 | 7/2014 | Solbach | |
| 8,781,137 B1 | 7/2014 | Goodwin | |
| 8,798,290 B1 | 8/2014 | Choi et al. | |
| 8,880,396 B1 * | 11/2014 | Laroche | G10L 21/0232 |
| | | | 704/226 |
| 8,886,525 B2 | 11/2014 | Klein | |
| 8,903,721 B1 | 12/2014 | Cowan | |

(56) References Cited

U.S. PATENT DOCUMENTS

| | | |
|---|---|---|
| 8,949,120 B1 | 2/2015 | Every et al. |
| 8,949,266 B2 | 2/2015 | Phillips et al. |
| 9,007,416 B1 | 4/2015 | Murgia et al. |
| 9,008,329 B1 | 4/2015 | Mandel et al. |
| 9,143,857 B2 | 9/2015 | Every et al. |
| 9,185,487 B2 | 11/2015 | Solbach et al. |
| 9,197,974 B1 | 11/2015 | Clark et al. |
| 9,343,056 B1 | 5/2016 | Goodwin |
| 9,431,023 B2 | 8/2016 | Avendano et al. |
| 2001/0044719 A1 | 11/2001 | Casey |
| 2002/0002455 A1 | 1/2002 | Accardi et al. |
| 2002/0041678 A1 | 4/2002 | Basburg-Ertem et al. |
| 2002/0071342 A1 | 6/2002 | Marple et al. |
| 2002/0138263 A1* | 9/2002 | Deligne ............... G10L 15/20 704/233 |
| 2002/0156624 A1 | 10/2002 | Gigi |
| 2002/0160751 A1 | 10/2002 | Sun et al. |
| 2002/0176589 A1 | 11/2002 | Buck et al. |
| 2002/0177995 A1* | 11/2002 | Walker ............... G01R 23/16 704/205 |
| 2002/0194159 A1 | 12/2002 | Kamath et al. |
| 2003/0014248 A1 | 1/2003 | Vetter |
| 2003/0040908 A1 | 2/2003 | Yang et al. |
| 2003/0056220 A1 | 3/2003 | Thornton et al. |
| 2003/0063759 A1 | 4/2003 | Brennan et al. |
| 2003/0093279 A1 | 5/2003 | Malah et al. |
| 2003/0099370 A1 | 5/2003 | Moore |
| 2003/0101048 A1 | 5/2003 | Liu |
| 2003/0103632 A1 | 6/2003 | Goubran et al. |
| 2003/0118200 A1 | 6/2003 | Beaucoup et al. |
| 2003/0128851 A1 | 7/2003 | Furuta |
| 2003/0147538 A1 | 8/2003 | Elko |
| 2003/0169891 A1 | 9/2003 | Ryan et al. |
| 2003/0177006 A1* | 9/2003 | Ichikawa ............ G10L 21/0216 704/231 |
| 2003/0179888 A1 | 9/2003 | Burnett et al. |
| 2003/0191641 A1 | 10/2003 | Acero et al. |
| 2004/0013276 A1 | 1/2004 | Ellis et al. |
| 2004/0066940 A1 | 4/2004 | Amir |
| 2004/0076190 A1 | 4/2004 | Goel et al. |
| 2004/0078199 A1 | 4/2004 | Kremer et al. |
| 2004/0102967 A1* | 5/2004 | Furuta et al. ............... 704/226 |
| 2004/0131178 A1 | 7/2004 | Shahaf et al. |
| 2004/0145871 A1 | 7/2004 | Lee |
| 2004/0148166 A1 | 7/2004 | Zheng |
| 2004/0172240 A1* | 9/2004 | Crockett ............ G10L 25/48 704/205 |
| 2004/0184882 A1 | 9/2004 | Cosgrove |
| 2004/0185804 A1 | 9/2004 | Kanamori et al. |
| 2004/0263636 A1 | 12/2004 | Cutler et al. |
| 2005/0008169 A1 | 1/2005 | Muren et al. |
| 2005/0027520 A1 | 2/2005 | Mattila et al. |
| 2005/0049857 A1 | 3/2005 | Seltzer et al. |
| 2005/0066279 A1 | 3/2005 | LeBarton et al. |
| 2005/0069162 A1 | 3/2005 | Haykin et al. |
| 2005/0075866 A1 | 4/2005 | Widrow |
| 2005/0080616 A1 | 4/2005 | Leung et al. |
| 2005/0114123 A1* | 5/2005 | Lukac et al. ............... 704/222 |
| 2005/0114128 A1 | 5/2005 | Hetherington et al. |
| 2005/0152563 A1 | 7/2005 | Amada et al. |
| 2005/0213739 A1 | 9/2005 | Rodman et al. |
| 2005/0238238 A1 | 10/2005 | Xu et al. |
| 2005/0240399 A1* | 10/2005 | Makinen ............... 704/223 |
| 2005/0261894 A1 | 11/2005 | Balan et al. |
| 2005/0261896 A1 | 11/2005 | Schuijers et al. |
| 2005/0267369 A1 | 12/2005 | Lazenby et al. |
| 2005/0276363 A1 | 12/2005 | Joublin et al. |
| 2005/0281410 A1 | 12/2005 | Grosvenor et al. |
| 2005/0288923 A1 | 12/2005 | Kok |
| 2006/0053007 A1 | 3/2006 | Niemisto |
| 2006/0058998 A1 | 3/2006 | Yamamoto et al. |
| 2006/0063560 A1 | 3/2006 | Herle |
| 2006/0072768 A1 | 4/2006 | Schwartz et al. |
| 2006/0092918 A1 | 5/2006 | Talalai |
| 2006/0100868 A1 | 5/2006 | Hetherington et al. |
| 2006/0122832 A1* | 6/2006 | Takiguchi ............ G10L 21/0208 704/240 |
| 2006/0136201 A1 | 6/2006 | Landron et al. |
| 2006/0136203 A1 | 6/2006 | Ichikawa |
| 2006/0153391 A1 | 7/2006 | Hooley et al. |
| 2006/0165202 A1 | 7/2006 | Thomas et al. |
| 2006/0184363 A1 | 8/2006 | McCree et al. |
| 2006/0206320 A1* | 9/2006 | Li ............... G10L 21/0208 704/226 |
| 2006/0224382 A1 | 10/2006 | Taneda |
| 2006/0282263 A1 | 12/2006 | Vos et al. |
| 2007/0003097 A1 | 1/2007 | Langberg et al. |
| 2007/0005351 A1 | 1/2007 | Sathyendra et al. |
| 2007/0025562 A1 | 2/2007 | Zalewski et al. |
| 2007/0033020 A1* | 2/2007 | (Kelleher) Francois et al. ............... 704/226 |
| 2007/0033032 A1 | 2/2007 | Schubert et al. |
| 2007/0041589 A1 | 2/2007 | Patel et al. |
| 2007/0055508 A1* | 3/2007 | Zhao ............... G10L 21/0216 704/226 |
| 2007/0058822 A1 | 3/2007 | Ozawa |
| 2007/0064817 A1 | 3/2007 | Dunne et al. |
| 2007/0071206 A1 | 3/2007 | Gainsboro et al. |
| 2007/0081075 A1 | 4/2007 | Canova, Jr. et al. |
| 2007/0110263 A1 | 5/2007 | Brox |
| 2007/0127668 A1 | 6/2007 | Ahya et al. |
| 2007/0150268 A1* | 6/2007 | Acero ............... G10L 21/0208 704/226 |
| 2007/0154031 A1 | 7/2007 | Avendano et al. |
| 2007/0185587 A1 | 8/2007 | Kondo |
| 2007/0195968 A1 | 8/2007 | Jaber |
| 2007/0230712 A1 | 10/2007 | Belt et al. |
| 2007/0230913 A1 | 10/2007 | Ichimura |
| 2007/0237339 A1 | 10/2007 | Konchitsky |
| 2007/0253574 A1 | 11/2007 | Soulodre |
| 2007/0282604 A1 | 12/2007 | Gartner et al. |
| 2007/0287490 A1 | 12/2007 | Green et al. |
| 2007/0294263 A1 | 12/2007 | Punj et al. |
| 2008/0019548 A1 | 1/2008 | Avendano |
| 2008/0059163 A1 | 3/2008 | Ding et al. |
| 2008/0069366 A1 | 3/2008 | Soulodre |
| 2008/0111734 A1 | 5/2008 | Fam et al. |
| 2008/0159507 A1 | 7/2008 | Virolainen et al. |
| 2008/0160977 A1 | 7/2008 | Ahmaniemi et al. |
| 2008/0170703 A1 | 7/2008 | Zivney |
| 2008/0187143 A1 | 8/2008 | Mak-Fan |
| 2008/0192955 A1 | 8/2008 | Merks |
| 2008/0228474 A1 | 9/2008 | Huang et al. |
| 2008/0233934 A1 | 9/2008 | Diethorn |
| 2008/0247567 A1 | 10/2008 | Kjolerbakken et al. |
| 2008/0259731 A1 | 10/2008 | Happonen |
| 2008/0273476 A1 | 11/2008 | Cohen et al. |
| 2008/0298571 A1 | 12/2008 | Kurtz et al. |
| 2008/0304677 A1 | 12/2008 | Abolfathi et al. |
| 2008/0317259 A1* | 12/2008 | Zhang ............... G10L 15/04 381/92 |
| 2008/0317261 A1 | 12/2008 | Yoshida et al. |
| 2009/0012783 A1 | 1/2009 | Klein |
| 2009/0034755 A1 | 2/2009 | Short et al. |
| 2009/0060222 A1 | 3/2009 | Jeong et al. |
| 2009/0063143 A1 | 3/2009 | Schmidt et al. |
| 2009/0089054 A1* | 4/2009 | Wang et al. ............... 704/233 |
| 2009/0116652 A1 | 5/2009 | Kirkeby et al. |
| 2009/0116656 A1 | 5/2009 | Lee et al. |
| 2009/0134829 A1 | 5/2009 | Baumann et al. |
| 2009/0141908 A1 | 6/2009 | Jeong et al. |
| 2009/0147942 A1 | 6/2009 | Culter |
| 2009/0150149 A1 | 6/2009 | Culter et al. |
| 2009/0164905 A1 | 6/2009 | Ko |
| 2009/0177464 A1 | 7/2009 | Gao et al. |
| 2009/0192791 A1 | 7/2009 | El-Maleh et al. |
| 2009/0192803 A1* | 7/2009 | Nagaraja ............ G10L 19/012 704/278 |
| 2009/0220107 A1 | 9/2009 | Every et al. |
| 2009/0226010 A1 | 9/2009 | Schnell et al. |
| 2009/0228272 A1 | 9/2009 | Herbig et al. |
| 2009/0240497 A1 | 9/2009 | Usher et al. |
| 2009/0253418 A1 | 10/2009 | Makinen |
| 2009/0264114 A1 | 10/2009 | Virolainen et al. |

(56) References Cited

U.S. PATENT DOCUMENTS

| | | | |
|---|---|---|---|
| 2009/0271187 A1* | 10/2009 | Yen et al. ............. | 704/226 |
| 2009/0292536 A1 | 11/2009 | Hetherington et al. | |
| 2009/0303350 A1 | 12/2009 | Terada | |
| 2009/0323655 A1 | 12/2009 | Cardona et al. | |
| 2009/0323925 A1 | 12/2009 | Sweeney et al. | |
| 2009/0323981 A1 | 12/2009 | Cutler | |
| 2009/0323982 A1 | 12/2009 | Solbach et al. | |
| 2010/0017205 A1* | 1/2010 | Visser et al. ............. | 704/225 |
| 2010/0036659 A1* | 2/2010 | Haulick et al. ............. | 704/226 |
| 2010/0082339 A1 | 4/2010 | Konchitsky et al. | |
| 2010/0092007 A1 | 4/2010 | Sun | |
| 2010/0094622 A1 | 4/2010 | Cardillo et al. | |
| 2010/0103776 A1 | 4/2010 | Chan | |
| 2010/0105447 A1 | 4/2010 | Sibbald et al. | |
| 2010/0128123 A1 | 5/2010 | DiPoala | |
| 2010/0130198 A1 | 5/2010 | Kannappan et al. | |
| 2010/0138220 A1 | 6/2010 | Matsumoto et al. | |
| 2010/0177916 A1 | 7/2010 | Gerkmann et al. | |
| 2010/0215184 A1 | 8/2010 | Buck et al. | |
| 2010/0217837 A1 | 8/2010 | Ansari et al. | |
| 2010/0245624 A1 | 9/2010 | Beaucoup | |
| 2010/0278352 A1 | 11/2010 | Petit et al. | |
| 2010/0282045 A1 | 11/2010 | Chen et al. | |
| 2010/0303298 A1 | 12/2010 | Marks et al. | |
| 2010/0315482 A1 | 12/2010 | Rosenfeld et al. | |
| 2011/0026734 A1 | 2/2011 | Hetherington et al. | |
| 2011/0038486 A1 | 2/2011 | Beaucoup | |
| 2011/0060587 A1 | 3/2011 | Phillips et al. | |
| 2011/0081024 A1 | 4/2011 | Soulodre | |
| 2011/0081026 A1 | 4/2011 | Ramakrishnan et al. | |
| 2011/0091047 A1 | 4/2011 | Konchitsky et al. | |
| 2011/0101654 A1 | 5/2011 | Cech | |
| 2011/0129095 A1 | 6/2011 | Avendano et al. | |
| 2011/0173006 A1 | 7/2011 | Nagel et al. | |
| 2011/0173542 A1 | 7/2011 | Imes et al. | |
| 2011/0178800 A1 | 7/2011 | Watts | |
| 2011/0182436 A1 | 7/2011 | Murgia et al. | |
| 2011/0224994 A1 | 9/2011 | Norvell et al. | |
| 2011/0261150 A1 | 10/2011 | Goyal et al. | |
| 2011/0280154 A1 | 11/2011 | Silverstrim et al. | |
| 2011/0286605 A1* | 11/2011 | Furuta et al. ............. | 381/71.1 |
| 2011/0300806 A1 | 12/2011 | Lindahl et al. | |
| 2011/0305345 A1* | 12/2011 | Bouchard et al. ............. | 381/23.1 |
| 2012/0010881 A1 | 1/2012 | Avendano et al. | |
| 2012/0027217 A1 | 2/2012 | Jun et al. | |
| 2012/0027218 A1 | 2/2012 | Every et al. | |
| 2012/0050582 A1 | 3/2012 | Seshadri et al. | |
| 2012/0062729 A1 | 3/2012 | Hart et al. | |
| 2012/0063609 A1 | 3/2012 | Triki et al. | |
| 2012/0087514 A1 | 4/2012 | Williams et al. | |
| 2012/0093341 A1 | 4/2012 | Kim et al. | |
| 2012/0116758 A1 | 5/2012 | Murgia et al. | |
| 2012/0116769 A1 | 5/2012 | Malah et al. | |
| 2012/0133728 A1 | 5/2012 | Lee | |
| 2012/0143363 A1 | 6/2012 | Liu et al. | |
| 2012/0179461 A1 | 7/2012 | Every et al. | |
| 2012/0179462 A1 | 7/2012 | Klein | |
| 2012/0182429 A1 | 7/2012 | Forutanpour et al. | |
| 2012/0197898 A1 | 8/2012 | Pandey et al. | |
| 2012/0202485 A1 | 8/2012 | Mirbaha et al. | |
| 2012/0220347 A1 | 8/2012 | Davidson | |
| 2012/0231778 A1 | 9/2012 | Chen et al. | |
| 2012/0249785 A1 | 10/2012 | Sudo et al. | |
| 2012/0250882 A1 | 10/2012 | Mohammad et al. | |
| 2013/0011111 A1 | 1/2013 | Abraham et al. | |
| 2013/0024190 A1 | 1/2013 | Fairey | |
| 2013/0034243 A1* | 2/2013 | Yermeche et al. ............. | 381/94.1 |
| 2013/0051543 A1 | 2/2013 | McDysan et al. | |
| 2013/0182857 A1 | 7/2013 | Namba et al. | |
| 2013/0196715 A1 | 8/2013 | Hansson et al. | |
| 2013/0231925 A1 | 9/2013 | Avendano et al. | |
| 2013/0251170 A1 | 9/2013 | Every et al. | |
| 2013/0268280 A1 | 10/2013 | Del Galdo et al. | |
| 2013/0332171 A1 | 12/2013 | Avendano et al. | |
| 2014/0039888 A1 | 2/2014 | Taubman et al. | |
| 2014/0098964 A1 | 4/2014 | Rosca et al. | |
| 2014/0108020 A1 | 4/2014 | Sharma et al. | |
| 2014/0112496 A1 | 4/2014 | Murgia et al. | |
| 2014/0142958 A1 | 5/2014 | Sharma et al. | |
| 2014/0241702 A1 | 8/2014 | Solbach et al. | |
| 2014/0337016 A1 | 11/2014 | Herbig et al. | |
| 2015/0030163 A1 | 1/2015 | Sokolov | |
| 2015/0100311 A1 | 4/2015 | Kar et al. | |
| 2016/0027451 A1 | 1/2016 | Solbach et al. | |
| 2016/0063997 A1 | 3/2016 | Nemala et al. | |
| 2016/0066089 A1 | 3/2016 | Klein | |

FOREIGN PATENT DOCUMENTS

| | | |
|---|---|---|
| EP | 1536660 | 6/2005 |
| FI | 20100431 A | 12/2010 |
| FI | 20125812 | 10/2012 |
| FI | 20135038 | 4/2013 |
| FI | 124716 B | 12/2014 |
| JP | H0553587 A | 3/1993 |
| JP | H07248793 A | 9/1995 |
| JP | H05300419 | 12/1995 |
| JP | 2001159899 A | 6/2001 |
| JP | 2002366200 A | 12/2002 |
| JP | 2002542689 A | 12/2002 |
| JP | 2003514473 A | 4/2003 |
| JP | 2003271191 A | 9/2003 |
| JP | 2004187283 A | 7/2004 |
| JP | 2006094522 A | 4/2006 |
| JP | 2006515490 | 5/2006 |
| JP | 2006337415 A | 12/2006 |
| JP | 2007006525 A | 1/2007 |
| JP | 2008015443 A | 1/2008 |
| JP | 2008135933 A | 6/2008 |
| JP | 2008542798 | 11/2008 |
| JP | 2009037042 | 2/2009 |
| JP | 2010532879 A | 10/2010 |
| JP | 2011527025 A | 10/2011 |
| JP | H07336793 | 12/2011 |
| JP | 2013517531 A | 5/2013 |
| JP | 2013534651 A | 9/2013 |
| JP | 5762956 B2 | 6/2015 |
| KR | 1020100041741 | 4/2010 |
| KR | 1020110038024 | 4/2011 |
| KR | 1020120116442 | 10/2012 |
| KR | 1020130117750 | 10/2013 |
| KR | 101461141 B1 | 11/2014 |
| KR | 101610656 | 4/2016 |
| TW | 526468 B | 4/2003 |
| TW | I279776 B | 4/2007 |
| TW | 200910793 A | 3/2009 |
| TW | 201009817 A | 3/2010 |
| TW | 201143475 | 12/2011 |
| TW | 201214418 A | 4/2012 |
| TW | I463817 B | 12/2014 |
| TW | I488179 B | 6/2015 |
| WO | WO8400634 | 2/1984 |
| WO | WO0137265 | 5/2001 |
| WO | WO0156328 | 8/2001 |
| WO | WO2006027707 A1 | 3/2006 |
| WO | WO2007001068 A1 | 1/2007 |
| WO | WO2007049644 A1 | 5/2007 |
| WO | WO2008054221 | 3/2008 |
| WO | WO2008101198 A2 | 8/2008 |
| WO | WO2009008998 A1 | 1/2009 |
| WO | WO2010005493 A1 | 1/2010 |
| WO | WO2011068901 | 6/2011 |
| WO | WO2011091068 A1 | 7/2011 |
| WO | WO2011129725 A1 | 10/2011 |
| WO | WO2012009047 A1 | 1/2012 |
| WO | WO2012097016 A1 | 7/2012 |
| WO | WO2013188562 | 12/2013 |
| WO | WO2014063099 A1 | 4/2014 |

(56) References Cited

FOREIGN PATENT DOCUMENTS

| | | |
|---|---|---|
| WO | WO2014131054 A2 | 8/2014 |
| WO | WO2016033364 A1 | 3/2016 |

OTHER PUBLICATIONS

Final Office Action, Apr. 28, 2011, U.S. Appl. No. 11/825,563, filed Jul. 6, 2007.
Non-Final Office Action, Apr. 24, 2013, U.S. Appl. No. 11/825,563, filed Jul. 6, 2007.
Final Office Action, Dec. 30, 2013, U.S. Appl. No. 11/825,563, filed Jul. 6, 2007.
Notice of Allowance, Mar. 25, 2014, U.S. Appl. No. 11/825,563, filed Jul. 6, 2007.
Non-Final Office Action, Sep. 14, 2011, U.S. Appl. No. 12/004,897, filed Dec. 21, 2007.
Notice of Allowance, Jan. 27, 2012, U.S. Appl. No. 12/004,897, filed Dec. 21, 2007.
Non-Final Office Action, Jul. 28, 2011, U.S. Appl. No. 12/072,931, filed Feb. 29, 2008.
Notice of Allowance, Mar. 1, 2012, U.S. Appl. No. 12/072,931, filed Feb. 29, 2008.
Notice of Allowance, Mar. 1, 2012, U.S. Appl. No. 12/080,115, filed Mar. 31, 2008.
Non-Final Office Action, Nov. 14, 2011, U.S. Appl. No. 12/215,980, filed Jun. 30, 2008.
Final Office Action, Apr. 24, 2012, U.S. Appl. No. 12/215,980, filed Jun. 30, 2008.
Advisory Action, Jul. 3, 2012, U.S. Appl. No. 12/215,980, filed Jun. 30, 2008.
Non-Final Office Action, Mar. 11, 2014, U.S. Appl. No. 12/215,980, filed Jun. 30, 2008.
Final Office Action, Jul. 11, 2014, U.S. Appl. No. 12/215,980, filed Jun. 30, 2008.
Non-Final Office Action, Dec. 8, 2014, U.S. Appl. No. 12/215,980, filed Jun. 30, 2008.
Notice of Allowance, Jul. 7, 2015, U.S. Appl. No. 12/215,980, filed Jun. 30, 2008.
Non-Final Office Action, Sep. 1, 2011, U.S. Appl. No. 12/286,909, filed Oct. 2, 2008.
Notice of Allowance, Feb. 28, 2012, U.S. Appl. No. 12/286,909, filed Oct. 2, 2008.
Non-Final Office Action, Nov. 15, 2011, U.S. Appl. No. 12/286,995, filed Oct. 2, 2008.
Final Office Action, Apr. 10, 2012, U.S. Appl. No. 12/286,995, filed Oct. 2, 2008.
Notice of Allowance, Mar. 13, 2014, U.S. Appl. No. 12/286,995, filed Oct. 2, 2008.
Non-Final Office Action, Aug. 1, 2012, U.S. Appl. No. 12/860,043, filed Aug. 20, 2010.
Notice of Allowance, Jan. 18, 2013, U.S. Appl. No. 12/860,043, filed Aug. 22, 2010.
Non-Final Office Action, Aug. 17, 2012, U.S. Appl. No. 12/868,622, filed Aug. 25, 2010.
Final Office Action, Feb. 22, 2013, U.S. Appl. No. 12/868,622, filed Aug. 25, 2010.
Advisory Action, May 14, 2013, U.S. Appl. No. 12/868,622, filed Aug. 25, 2010.
Notice of Allowance, May 1, 2014, U.S. Appl. No. 12/868,622, filed Aug. 25, 2010.
Non-Final Office Action, Feb. 19, 2013, U.S. Appl. No. 12/944,659, filed Nov. 11, 2010.
Final Office Action, Jan. 12, 2016, U.S. Appl. No. 12/959,994, filed Dec. 3, 2010.
Notice of Allowance, May 25, 2011, U.S. Appl. No. 13/016,916, filed Jan. 28, 2011.
Notice of Allowance, Aug. 4, 2011, U.S. Appl. No. 13/016,916, filed Jan. 28, 2011.
Notice of Allowance, Oct. 3, 2013, U.S. Appl. No. 13/157,238, filed Jun. 9, 2011.
Non-Final Office Action, Nov. 2013, U.S. Appl. No. 13/363,362, filed Jan. 31, 2012.
Final Office Action, Sep. 12, 2014, U.S. Appl. No. 13/363,362, filed Jan. 31, 2012.
Non-Final Office Action, Oct. 28, 2015, U.S. Appl. No. 13/363,362, filed Jan. 31, 2012.
Non-Final Office Action, Dec. 4, 2013, U.S. Appl. No. 13/396,568, filed Feb. 14, 2012.
Final Office Action, Sep. 23, 2014, U.S. Appl. No. 13/396,568, filed Feb. 14, 2012.
Non-Final Office Action, Nov. 5, 2015, U.S. Appl. No. 13/396,568, filed Feb. 14, 2012.
Non-Final Office Action, May 11, 2012, U.S. Appl. No. 13/424,189, filed Mar. 19, 2012.
Final Office Action, Sep. 4, 2012, U.S. Appl. No. 13/424,189, filed Mar. 19, 2012.
Final Office Action, Nov. 28, 2012, U.S. Appl. No. 13/424,189, filed Mar. 19, 2012.
Notice of Allowance, Mar. 7, 2013, U.S. Appl. No. 13/424,189, filed Mar. 19, 2012.
Non-Final Office Action, Jun. 7, 2012, U.S. Appl. No. 13/426,436, filed Mar. 21, 2012.
Final Office Action, Dec. 31, 2012, U.S. Appl. No. 13/426,436, filed Mar. 21, 2012.
Non-Final Office Action, Sep. 12, 2013, U.S. Appl. No. 13/426,436, filed Mar. 21, 2012.
Notice of Allowance, Jul. 16, 2014, U.S. Appl. No. 13/426,436, filed Mar. 21, 2012.
Non-Final Office Action, Nov. 7, 2012, U.S. Appl. No. 13/492,780, filed Jun. 8, 2012.
Non-Final Office Action, May 8, 2013, U.S. Appl. No. 13/492,780, filed Jun. 8, 2012.
Final Office Action, Oct. 23, 2013, U.S. Appl. No. 13/492,780, filed Jun. 8, 2012.
Notice of Allowance, Nov. 24, 2014, U.S. Appl. No. 13/492,780, filed Jun. 8, 2012.
Non-Final Office Action, May 23, 2014, U.S. Appl. No. 13/859,186, filed Apr. 9, 2013.
Final Office Action, Dec. 3, 2014, U.S. Appl. No. 13/859,186, filed Apr. 9, 2013.
Non-Final Office Action, Jul. 7, 2015, U.S. Appl. No. 13/859,186, filed Apr. 9, 2013.
Final Office Action, Feb. 2, 2016, U.S. Appl. No. 13/859,186, filed Apr. 9, 2013.
Notice of Allowance, Apr. 28, 2016, U.S. Appl. No. 13/859,186, filed Apr. 9, 2013.
Non-Final Office Action, Apr. 17, 2015, U.S. Appl. No. 13/888,796, filed May 7, 2013.
Non-Final Office Action, Jul. 14, 2015, U.S. Appl. No. 14/046,551, filed Oct. 4, 2013.
Notice of Allowance, May 20, 2015, U.S. Appl. No. 13/888,796, filed May 7, 2013.
Non-Final Office Action, Apr. 19, 2016, U.S. Appl. No. 14/046,551, filed Oct. 4, 2013.
Non-Final Office Action, May 21, 2015, U.S. Appl. No. 14/189,817, filed Feb. 25, 2014.
Final Office Action, Dec. 15, 2015, U.S. Appl. No. 14/189,817, filed Feb. 25, 2014.
Non-Final Office Action, Jul. 15, 2015, U.S. Appl. No. 14/058,059, filed Oct. 18, 2013.
Non-Final Office Action, Jun. 26, 2015, U.S. Appl. No. 14/262,489, filed Apr. 25, 2014.
Notice of Allowance, Jan. 28, 2016, U.S. Appl. No. 14/313,883, filed Jun. 24, 2014.
Non-Final Office Action, Jun. 26, 2015, U.S. Appl. No. 14/626,489, filed Apr. 25, 2014.
Non-Final Office Action, Jun. 10, 2015, U.S. Appl. No. 14/628,109, filed Feb. 20, 2015.
Final Office Action, Mar. 16, 2016, U.S. Appl. No. 14/628,109, filed Feb. 20, 2015.

(56) References Cited

OTHER PUBLICATIONS

Non-Final Office Action, Apr. 8, 2016, U.S. Appl. No. 14/838,133, filed Aug. 27, 2015.
Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.
Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.
Kato et al., "Noise Suppression with High Speech Quality Based on Weighted Noise Estimation and MMSE STSA" Proc. IWAENC [Online] 2001, pp. 183-186.
Soon et al., "Low Distortion Speech Enhancement", Proc. Inst. Elect. Eng. [Online] 2000, vol. 147, pp. 247-253.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report and Written Opinion dated Oct. 1, 2008 in Patent Cooperation Treaty Application No. PCT/US2008/008249.
International Search Report and Written Opinion dated Aug. 27, 2009 in Patent Cooperation Treaty Application No. PCT/US2009/003813.
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
International Search Report and Written Opinion dated Sep. 1, 2011 in Patent Cooperation Treaty Application No. PCT/US11/37250.
Fazel et al., "An overview of statistical pattern recognition techniques for speaker verification," IEEE, May 2011.
Sundaram et al., "Discriminating Two Types of Noise Sources Using Cortical Representation and Dimension Reduction Technique," IEEE, 2007.
Bach et al., "Learning Spectral Clustering with application to spech separation", Journal of machine learning research, 2006.
Tognieri et al., "A Comparison of the LBG, LVQ, MLP, SOM and GMM Algorithms for Vector Quantisation and Clustering Analysis," University of Western Australia, 1992.
Klautau et al., "Discriminative Gaussian Mixture Models a Comparison with Kernel Classifiers," ICML, 2003.
Mokbel et al., "Automatic Word Recognition in Cars," IEEE Transactions of Speech and Audio Processing, vol. 3, No. 5, Sep. 1995, pp. 346-356.
Office Action mailed Oct. 14, 2013 in Taiwan Patent Application 097125481, filed Jul. 4, 2008.
Office Action mailed Oct. 29, 2013 in Japan Patent Application 2011-516313, filed Jun. 26, 2009.
Office Action mailed Dec. 9, 2013 in Finland Patent Application 20100431, filed Jun. 26, 2009.
Office Action mailed Jan. 20, 2014 in Finland Patent Application 20100001, filed Jul. 3, 2008.
International Search Report & Written Opinion dated Mar. 18, 2014 in Patent Cooperation Treaty Application No. PCT/US2013/065752, filed Oct. 18, 2013.
Office Action mailed Oct. 17, 2013 in Taiwan Patent Application 097125481, filed Jul. 4, 2008.
Allowance mailed May 21, 2014 in Finland Patent Application 20100001, filed Jan. 4, 2010.
Office Action mailed May 2, 2014 in Taiwan Patent Application 098121933, filed Jun. 29, 2009.
Office Action mailed Apr. 15, 2014 in Japan Patent Application 2010-514871, filed Jul. 3, 2008.
Office Action mailed Jun. 27, 2014 in Korean Patent Application No. 10-2010-7000194, filed Jan. 6, 2010.
International Search Report & Written Opinion dated Jul. 15, 2014 in Patent Cooperation Treaty Application No. PCT/US2014/018443, filed Feb. 25, 2014.
Notice of Allowance dated Sep. 16, 2014 in Korean Application No. 10-2010-7000194, filed Jul. 3, 2008.
Notice of Allowance dated Sep. 29, 2014 in Taiwan Application No. 097125481, filed Jul. 4, 2008.
Notice of Allowance dated Oct. 10, 2014 in Finland Application No. 20100001, filed Jul. 3, 2008.
Notice of Allowance mailed Feb. 10, 2015 in Taiwan Patent Application No. 098121933, filed Jun. 29, 2009.
Office Action mailed Mar. 24, 2015 in Japan Patent Application No. 2011-516313, filed Jun. 26, 2009.
Office Action mailed Apr. 16, 2015 in Korean Patent Application No. 10-2011-7000440, filed Jun. 26, 2009.
Notice of Allowance mailed Jun. 2, 2015 in Japan Patent Application 2011-516313, filed Jun. 26, 2009.
Kim et al., "Improving Speech Intelligibility in Noise Using Environment-Optimized Algorithms," IEEE Transactions on Audio, Speech, and Language Processing, vol. 18, No. 8, Nov. 2010, pp. 2080-2090.
Sharma et al., "Rotational Linear Discriminant Analysis Technique for Dimensionality Reduction," IEEE Transactions on Knowledge and Data Engineering, vol. 20, No. 10, Oct. 2008, pp. 1336-1347.
Temko et al., "Classifiation of Acoustic Events Using SVM-Based Clustering Schemes," Pattern Recognition 39, No. 4, 2006, pp. 682-694.
Office Action mailed Jun. 9, 2015 in Japan Patent Application 2014-165477 filed Jul. 3, 2008.
Office Action mailed Jun. 17, 2015 in Japan Patent Application 2013-519682 filed May 19, 2011.
International Search Report & Written Opinion dated Nov. 27, 2015 in Patent Cooperation Treaty Application No. PCT/US2015/047263, filed Aug. 27, 2015.
Notice of Allowance dated Feb. 24, 2016 in Korean Application No. 10-2011-7000440, filed Jun. 26, 2009.
Hu et al., "Robust Speaker's Location Detection in a Vehicle Environment Using GMM Models," IEEE Transactions on Systems, Man, and Cybernetics—Part B: Cybernetics, vol. 36, No. 2, Apr. 2006, pp. 403-412.
International Search Report and Written Opinion dated Feb. 7, 2011 in Application No. PCT/US10/58600.
International Search Report dated Dec. 20, 2013 in Patent Cooperation Treaty Application No. PCT/US2013/045462, filed Jun. 12, 2013.
Office Action dated Aug. 26, 2014 in Japanese Application No. 2012-542167, filed Dec. 1, 2010.
Office Action mailed Oct. 31, 2014 in Finnish Patent Application No. 20125600, filed Jun. 1, 2012.
Office Action mailed Jul. 21, 2015 in Japanese Patent Application 2012-542167 filed Dec. 1, 2010.
Office Action mailed Sep. 29, 2015 in Finnish Patent Application 20125600, filed Dec. 1, 2010.
Goodwin, Michael M. et al., "Key Click Suppression", U.S. Appl. No. 14/745,176, filed Jun. 19, 2015, 25 pages.
Final Office Action, May 5, 2016, U.S. Appl. No. 13/363,362, filed Jan. 31, 2012.
Non-Final Office Action, May 6, 2016, U.S. Appl. No. 14/495,550, filed Sep. 24, 2014.
Non-Final Office Action, May 31, 2016, U.S. Appl. No. 14/874,329, filed Oct. 2, 2015.
Final Office Action, Jun. 17, 2016, U.S. Appl. No. 13/396,568, filed Feb. 14, 2012.
Advisory Action, Jul. 29, 2016, U.S. Appl. No. 13/363,362, filed Jan. 31, 2012.
Final Office Action, Aug. 30, 2016, U.S. Appl. No. 14/838,133, filed Aug. 27, 2015.

\* cited by examiner

NOISE SUPPRESSION ASSISTED AUTOMATIC SPEECH RECOGNITION

CROSS-REFERENCE TO RELATED APPLICATIONS

This application claims the priority benefit of U.S. Provisional Application Ser. No. 61/346,851, titled "Noise Suppression Assisted Automatic Speech Recognition," filed May 20, 2010, the disclosure of the aforementioned application is incorporated herein by reference.

BACKGROUND OF THE INVENTION

Speech recognition systems have been used to convert spoken words into text. In medium and high noise environments, however, the accuracy of automatic speech recognition systems tends to degrade significantly. As a result, most speech recognition systems are used with audio captured in a noise-free environment.

Unlike speech recognition systems, a standard noise reduction strategy consists of strongly attenuating portions of the acoustic spectrum which are dominated by noise. Spectrum portions dominated by speech are preserved.

Strong attenuation of undesired spectrum portions is a valid strategy from the point of view of noise reduction and perceived output signal quality, it is not necessarily a good strategy for an automatic speech recognition system. In particular, the spectral regions strongly attenuated by noise suppression may have been necessary to extract features for speech recognition. As a result, the attenuation resulting from noise suppression corrupts the features of the speech signal more than the original noise signal. This corruption by the noise suppression of the speech signal, which is greater than the corruption caused by the added noise signal, causes the noise reduction algorithm to make automatic speech recognition results unusable.

SUMMARY OF THE INVENTION

The present technology may utilize noise suppression information to optimize or improve automatic speech recognition performed for a signal. Noise suppression may be performed on a noisy speech signal using a gain value. The gain to apply to the noisy signal as part of the noise suppression is selected to optimize speech recognition analysis of the resulting signal. The gain may be selected based on one or more features for a current sub band and time frame, as well as others. Noise suppression information may be provided to a speech recognition module to improve the robustness of the speech recognition analysis. Noise suppression information may also be used to encode and identify speech. Resources spent on automatic speech recognition such as a bit rate of a speech codec) may be selected based on the SNR.

An embodiment may enable processing of an audio signal. Sub-band signals may be generated from a received primary acoustic signal and a secondary acoustic signal. One or more features may be determined for a sub-band signal. Noise suppression information may be determined based the one or more features to a speech recognition module.

DETAILED DESCRIPTION OF THE INVENTION

The present technology may utilize noise suppression information to optimize or improve automatic speech recognition performed for a signal. Noise suppression may be performed on a noisy speech signal using a gain value. The gain to apply to the noisy signal as part of the noise suppression is selected to optimize speech recognition analysis of the resulting signal. The gain may be selected based on one or more features for a current sub band and time frame, as well as others.

Noise suppression information may be provided to a speech recognition module to improve the robustness of the speech recognition analysis. Noise suppression information may include voice activity detection (VAD) information, such as for example noise, an indication of whether a signal includes speech, an indication of a speech to noise ration (SNR) for a signal, and other information. Noise suppression information may also be used to encode and identify speech. Resources spent on automatic speech recognition such as a bit rate of a speech codec) may be selected based on the SNR.

Figure 1:
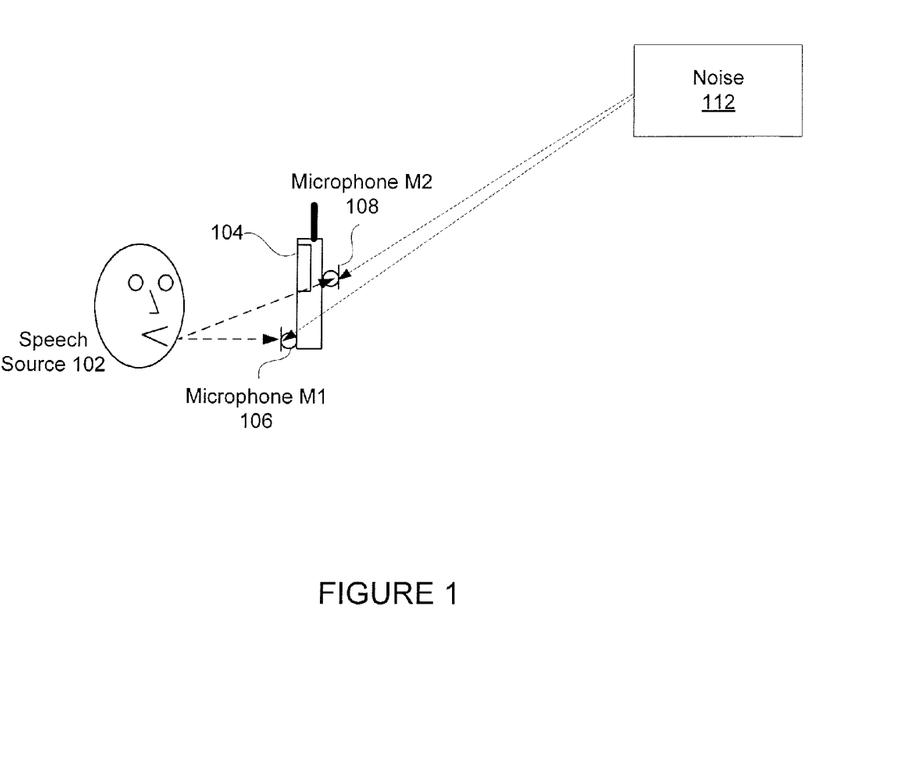
FIG. 1 illustrates an environment in which the present technology may be utilized.

FIG. 1 is an illustration of an environment in which embodiments of the present technology may be used. A user may act as an audio (speech) source 102 to an audio device 104. The exemplary audio device 104 includes two microphones: a primary microphone 106 relative to the audio source 102 and a secondary microphone 108 located a distance away from the primary microphone 106. Alternatively, the audio device 104 may include a single microphone. In yet other embodiments, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors, such as directional microphones.

While the microphones 106 and 108 receive sound (i.e. acoustic signals) from the audio source 102, the microphones 106 and 108 also pick up noise 112. Although the noise 110 is shown coming from a single location in FIG. 1, the noise 110 may include any sounds from one or more locations that differ from the location of audio source 102, and may include reverberations and echoes. The noise 110 may be stationary, non-stationary, and/or a combination of both stationary and non-stationary noise.

Some embodiments may utilize level differences (e.g. energy differences) between the acoustic signals received by the two microphones 106 and 108. Because the primary microphone 106 is much closer to the audio source 102 than the secondary microphone 108 in a close-talk use case, the intensity level is higher for the primary microphone 106, resulting in a larger energy level received by the primary microphone 106 during a speech/voice segment, for example.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 2:
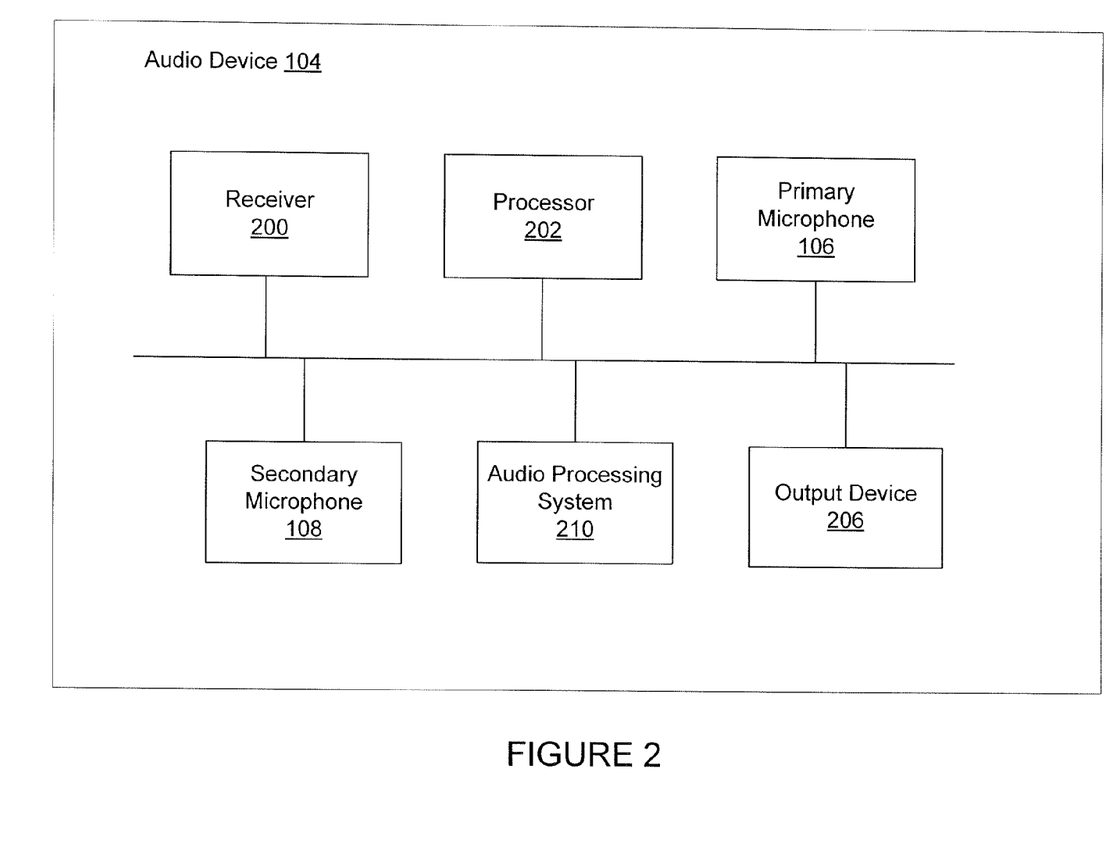
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise reduction for an acoustic signal, speech recognition, and other functionality. Processor 202 may include hardware and software implemented as a processing unit, which may process floating point operations and other operations for the processor 202.

The exemplary receiver 200 may include an acoustic sensor configured to receive and transmit a signal to and from a communications network. In some embodiments, the receiver 200 may include an antenna device. The signal received may be forwarded to the audio processing system 210 to reduce noise using the techniques described herein, and provide an audio signal to the output device 206. Similarly, a signal received by one or more of primary microphone 106 and secondary microphone 108 may be processed for noise suppression and ultimately transmitted to a communications network via receiver 200. Hence, the present technology may be used in one or both of the transmit and receive paths of the audio device 104.

The audio processing system 210 is configured to receive the acoustic signals from an acoustic source via the primary microphone 106 and secondary microphone 108 (or a far-end signal via receiver 200) and process the acoustic signals. Processing may include performing noise reduction within an acoustic signal and speech recognition for an acoustic signal. The audio processing system 210 is discussed in more detail below.

The primary and secondary microphones 106, 108 may be spaced a distance apart in order to allow for detecting an energy level difference, time difference or phase difference between them. The acoustic signals received by primary microphone 106 and secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 210 to produce a signal with an improved signal-to-noise ratio. It should be noted that embodiments of the technology described herein may be practiced utilizing only the primary microphone 106.

The output device 206 is any device which provides an audio output to the user. For example, the output device 206 may include a speaker, an earpiece of a headset or handset, or a speaker on a conference device.

In various embodiments, where the primary and secondary microphones are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
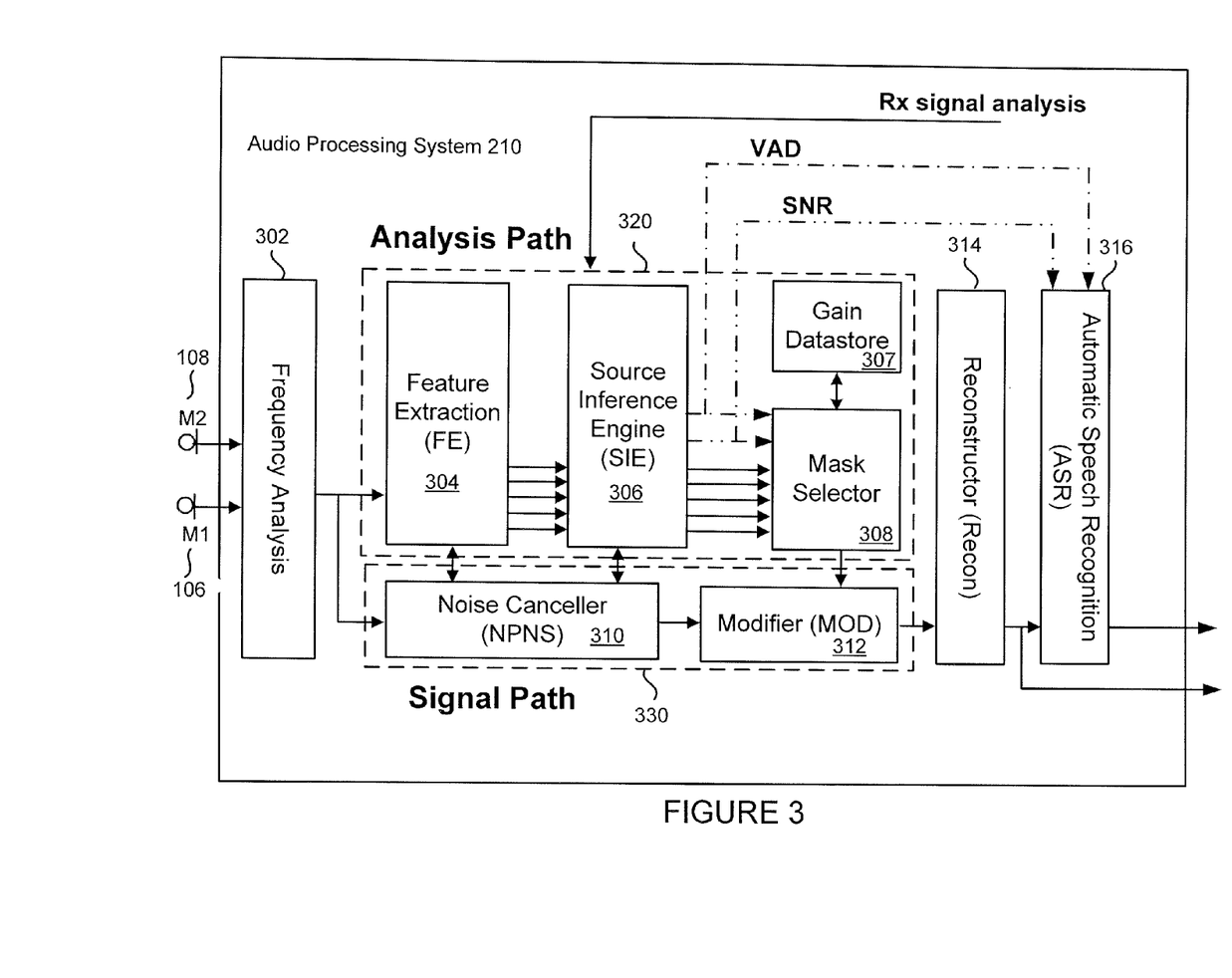
FIG. 3 is a block diagram of an exemplary audio processing system.

FIG. 3 is a block diagram of an exemplary audio processing system 210 for performing noise reduction and automatic speech recognition. In exemplary embodiments, the audio processing system 210 is embodied within a memory device within audio device 104. The audio processing system 210 may include a frequency analysis module 302, a feature extraction module 304, a source inference engine module 306, gain data store 307, mask selector module 308, noise canceller module 310, modifier module 312, reconstructor module 314, and automatic speech recognition 316. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, acoustic signals received from the primary microphone 106 and second microphone 108 are converted to electrical signals, and the electrical signals are processed through frequency analysis module 302. The acoustic signals may be pre-processed in the time domain before being processed by frequency analysis module 302. Time domain pre-processing may include applying input limiter gains, speech time stretching, and filtering using an FIR or IIR filter.

The frequency analysis module 302 receives the acoustic signals and mimics the frequency analysis of the cochlea (e.g., cochlear domain) to generate sub-band signals, simulated by a filter bank. The frequency analysis module 302 separates each of the primary and secondary acoustic signals into two or more frequency sub-band signals. A sub-band signal is the result of a filtering operation on an input signal, where the bandwidth of the filter is narrower than the bandwidth of the signal received by the frequency analysis module 302. The filter bank may be implemented by a series of cascaded, complex-valued, first-order IIR filters. Alternatively, other filters such as short-time Fourier transform (STFT), sub-band filter banks, modulated complex lapped transforms, cochlear models, wavelets, etc., can be used for the frequency analysis and synthesis. The samples of the frequency sub-band signals may be grouped sequentially into time frames (e.g. over a predetermined period of time). For example, the length of a frame may be 4 ms, 8 ms, or some other length of time. In some embodiments there may be no frame at all. The results may include sub-band signals in a fast cochlea transform (FCT) domain.

The sub-band frame signals are provided from frequency analysis module 302 to an analysis path sub-system 320 and a signal path sub-system 330. The analysis path sub-system 320 may process the signal to identify signal features, distinguish between speech components and noise components of the sub-band signals, and determine a signal modifier. The signal path sub-system 330 is responsible for modifying sub-band signals of the primary acoustic signal by reducing noise in the sub-band signals. Noise reduction can include applying a modifier, such as a multiplicative gain mask determined in the analysis path sub-system 320, or by subtracting components from the sub-band signals. The noise reduction may reduce noise and preserve the desired speech components in the sub-band signals.

Signal path sub-system 330 includes noise canceller module 310 and modifier module 312. Noise canceller module 310 receives sub-band frame signals from frequency analysis module 302. Noise canceller module 310 may subtract (e.g., cancel) a noise component from one or more sub-band signals of the primary acoustic signal. As such, noise canceller module 310 may output sub-band estimates of noise components in the primary signal and sub-band estimates of speech components in the form of noise-subtracted sub-band signals.

Noise canceller module 310 may provide noise cancellation, for example in systems with two-microphone configurations, based on source location by means of a subtractive algorithm. Noise canceller module 310 may also provide echo cancellation and is intrinsically robust to loudspeaker and Rx path non-linearity. By performing noise and echo cancellation (e.g., subtracting components from a primary signal sub-band) with little or no voice quality degradation, noise canceller module 310 may increase the speech-to-noise ratio (SNR) in sub-band signals received from frequency analysis module 302 and provided to modifier module 312 and post filtering modules. The amount of noise cancellation performed may depend on the diffuseness of the noise source and the distance between microphones, both of which contribute towards the coherence of the noise between the microphones, with greater coherence resulting in better cancellation.

Noise canceller module 310 may be implemented in a variety of ways. In some embodiments, noise canceller module 310 may be implemented with a single NPNS module. Alternatively, Noise canceller module 310 may include two or more NPNS modules, which may be arranged for example in a cascaded fashion.

An example of noise cancellation performed in some embodiments by the noise canceller module 310 is disclosed in U.S. patent application Ser. No. 12/215,980, entitled "System and Method for Providing Noise Suppression Utilizing Null Processing Noise Subtraction," filed Jun. 30, 2008, U.S. application Ser. No. 12/422,917, entitled "Adaptive Noise Cancellation," filed Apr. 13, 2009, and U.S. application Ser. No. 12/693,998, entitled "Adaptive Noise Reduction Using Level Cues," filed Jan. 26, 2010, the disclosures of which are each incorporated herein by reference.

The feature extraction module 304 of the analysis path sub-system 320 receives the sub-band frame signals derived from the primary and secondary acoustic signals provided by frequency analysis module 302 as well as the output of NPNS module 310. Feature extraction module 304 may compute frame energy estimations of the sub-band signals, inter-microphone level differences (ILD), inter-microphone time differences (ITD) and inter-microphones phase differences (IPD) between the primary acoustic signal and the secondary acoustic signal, self-noise estimates for the primary and second microphones, as well as other monaural or binaural features which may be utilized by other modules, such as pitch estimates and cross-correlations between microphone signals. The feature extraction module 304 may both provide inputs to and process outputs from NPNS module 310.

NPNS module may provide noise cancelled sub-band signals to the ILD block in the feature extraction module 304. Since the ILD may be determined as the ratio of the NPNS output signal energy to the secondary microphone energy, ILD is often interchangeable with Null Processing Inter-microphone Level Difference (NP-ILD). "Raw-ILD" may be used to disambiguate a case where the ILD is computed from the "raw" primary and secondary microphone signals.

Determining energy level estimates and inter-microphone level differences is discussed in more detail in U.S. patent application Ser. No. 11/343,524, entitled "System and Method for Utilizing Inter-Microphone Level Differences for Speech Enhancement", which is incorporated by reference herein.

Source inference engine module 306 may process the frame energy estimations provided by feature extraction module 304 to compute noise estimates and derive models of the noise and speech in the sub-band signals. Source inference engine module 306 adaptively estimates attributes of the acoustic sources, such as their energy spectra of the output signal of the NPNS module 310. The energy spectra attribute may be utilized to generate a multiplicative mask in mask generator module 308.

The source inference engine module 306 may receive the NP-ILD from feature extraction module 304 and track the NP-ILD probability distributions or "clusters" of the target audio source 102, background noise and optionally echo.

This information is then used, along with other auditory cues, to define classification boundaries between source and noise classes. The NP-ILD distributions of speech, noise and echo may vary over time due to changing environmental conditions, movement of the audio device 104, position of the hand and/or face of the user, other objects relative to the audio device 104, and other factors. The cluster tracker adapts to the time-varying NP-ILDs of the speech or noise source(s).

An example of tracking clusters by a cluster tracker module is disclosed in U.S. patent application Ser. No. 12/004,897, entitled "System and method for Adaptive Classification of Audio Sources," filed on Dec. 21, 2007, the disclosure of which is incorporated herein by reference.

Source inference engine module 306 may include a noise estimate module which may receive a noise/speech classification control signal from the cluster tracker module and the output of noise canceller module 310 to estimate the noise N(t,w), wherein t is a point in time and W represents a frequency or sub-band. A speech to noise ratio (SNR) can be generated by source inference engine module 306 from the noise estimate and a speech estimate, and the SNR can be provided to other modules within the audio device, such as automatic speech recognition module 316 and mask selector 308.

Gain data store 307 may include one or more stored gain values and may communicate with mask selector 308. Each stored gain may be associated with a set of one or more features. An exemplary set of features may include a speech to noise ratio and a frequency (i.e., a center frequency for a sub band). Other feature data may also be stored in gain store 307. Each gain stored in gain data store 307 may, when applied to a sub-band signal, provide as close to a clean speech signal as possible. Though the gains provide a speech signal with a reduced amount of noise, they may not provide the perceptually most desirable sounding speech.

In some embodiments, each gain stored in gain store 307 may be optimized for a set of features, such as for example a particular frequency and speech to noise ratio. For example, to determine an optimal gain value for a particular combination of features, a known speech spectrum may be combined with noise at various speech to noise ratios. Because the energy spectrum and noise are known, a gain can be determined which suppress the combined speech-noise signal into a clean speech signal which is ideal for speech recognition. In some embodiments, the gain is configured to suppress the speech-noise signal such that noise is reduced but no portion of the speech signal is attenuated or degraded. These gains derived from the combined signals for a known SNR are stored in the gain data store for different combination of frequency and speech to noise ratio.

Mask selector 308 may receive a set of one or more features and/or other data from source inference engine 306, query gain data store 307 for a gain associated with a particular set of features and/or other data, and provide an accessed gain to modifier 312. For example, for a particular sub band, mask selector 308 may receive a particular speech to noise ratio from source inference engine 306 for the particular sub band in the current frame. Mask selector 308 may then query data store 307 for a gain that is associated with the combination of the speech to noise ratio and the current sub band center frequency. Mask selector 308 receives the corresponding gain from gain data store 307 and provides the gain to modifier 312.

The accessed gain may be applied to the estimated noise subtracted sub-band signals provided, for example as a multiplicative mask, by noise canceller 310 to modifier 312. The modifier module 312 multiplies the gain masks to the noise-subtracted sub-band signals of the primary acoustic signal output by the noise canceller module 310. Applying the mask reduces energy levels of noise components in the sub-band signals of the primary acoustic signal and results in noise reduction.

Modifier module 312 receives the signal path cochlear samples from noise canceller module 310 and applies a gain mask received from mask selector 308 to the received samples. The signal path cochlear samples may include the noise subtracted sub-band signals for the primary acoustic signal. The gain mask provided by mask selector 308 may vary quickly, such as from frame to frame, and noise and speech estimates may vary between frames. To help address the variance, the upwards and downwards temporal slew rates of the mask may be constrained to within reasonable limits by modifier 312. The mask may be interpolated from the frame rate to the sample rate using simple linear interpolation, and applied to the sub-band signals by multiplicative noise suppression. Modifier module 312 may output masked frequency sub-band signals.

Reconstructor module 314 may convert the masked frequency sub-band signals from the cochlea domain back into the time domain. The conversion may include adding the masked frequency sub-band signals and phase shifted signals. Alternatively, the conversion may include multiplying the masked frequency sub-band signals with an inverse frequency of the cochlea channels. Once conversion to the time domain is completed, the synthesized acoustic signal may be output to the user via output device 206 and/or provided to a codec for encoding.

In some embodiments, additional post-processing of the synthesized time domain acoustic signal may be performed. For example, comfort noise generated by a comfort noise generator may be added to the synthesized acoustic signal prior to providing the signal to the user. Comfort noise may be a uniform constant noise that is not usually discernable to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and may be settable by a user. In some embodiments, the mask generator module 308 may have access to the level of comfort noise in order to generate gain masks that will suppress the noise to a level at or below the comfort noise.

Automatic speech recognition module 316 may perform a speech recognition analysis on the reconstructed signal output by reconstructor 314. Automatic speech recognition module 316 may receive a voice activity detection (VAD) signal as well as a speech to noise (SNR) ratio indication or other noise suppression information from source inference engine 306. The information received from source information engine 306, such as the VAD and SNR, may be used to optimize the speech recognition process performed by automatic speech recognition module 316. Speech recognition module 316 is discussed in more detail below.

The system of FIG. 3 may process several types of signals received by an audio device. The system may be applied to acoustic signals received via one or more microphones. The system may also process signals, such as a digital Rx signal, received through an antenna or other connection.

Figure 4:
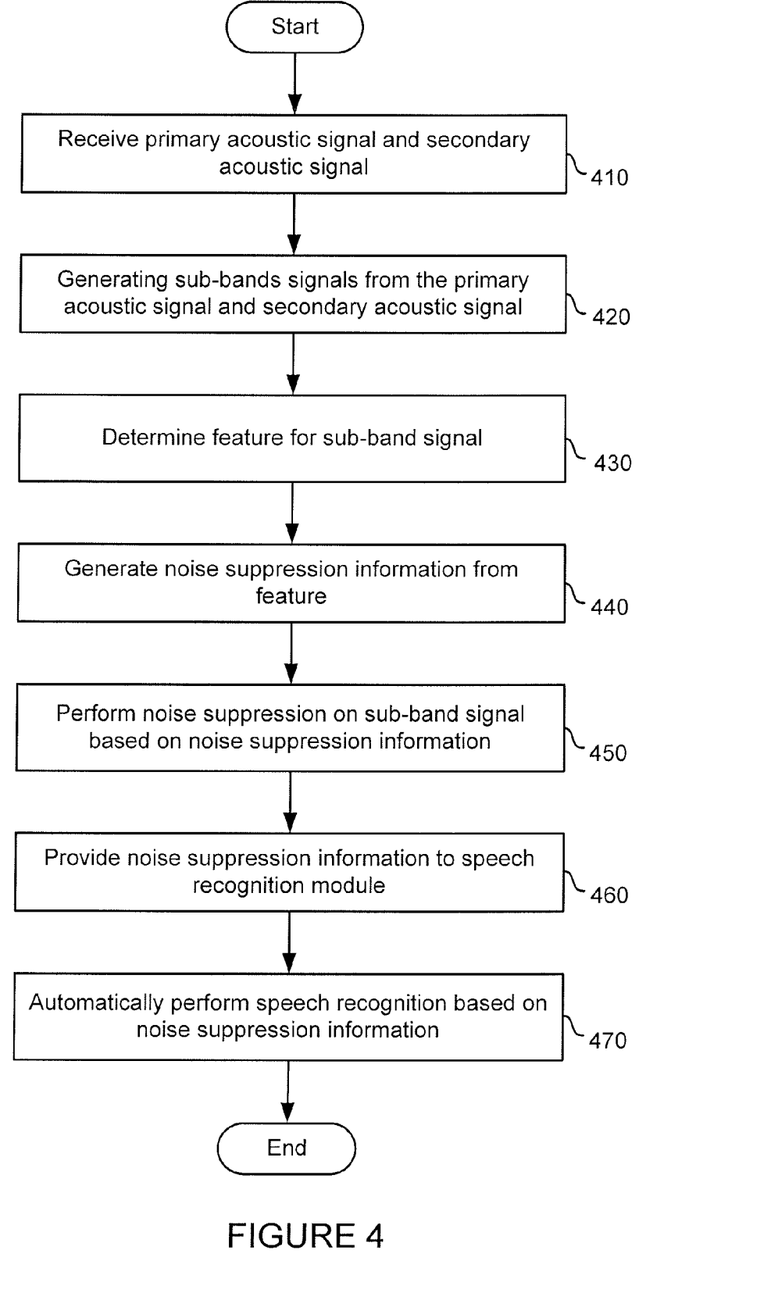
FIG. 4 is a flow chart of an exemplary method for performing speech recognition based on noise suppression information.

An exemplary system which may be used to implement at least a portion of audio processing system 210 is described in U.S. patent application Ser. No. 12/832,920, titled "Multi-Microphone Robust Noise Suppression," filed Jul. 8, 2010, the disclosure of which is incorporated herein by reference FIG. 4 is a flow chart of an exemplary method for performing speech recognition based on noise suppression information. First, a primary acoustic signal and a secondary acoustic signal are received at step 410. The signals may be received through microphones 106 and 108 of audio device 104. Sub band signals may then be generated from the primary acoustic signal and secondary acoustic signal at step 420. The received signals may be converted to sub band signals by frequency analysis module 302.

A feature is determined for a sub band signal at step 430. Feature extractor 304 may extract features for each sub band in the current frame or the frame as a whole. Features may include a speech energy level for a particular sub band noise level, pitch, and other features. Noise suppression information is then generated from the features at step 440. The noise suppression information may be generated and output by source inference engine 306 from features received from feature extraction module 304. The noise suppression information may include an SNR ratio for each sub band in the current frame, a VAD signal for the current frame, ILD, and other noise suppression information.

Noise suppression may be performed on a sub band signal based on noise suppression information at step 450. The noise suppression may include accessing a gain value based on one or more features and applying the gain to a sub band acoustic signal. Performing noise suppression on a sub band signal is discussed in more detail below with respect to the method of FIG. 5. Additionally, noise suppression performed on a sub band signal may include performing noise cancellation by noise canceller 310 in the audio processing system of FIG. 3.

Noise suppression information may be provided to speech recognition module 316 at step 460. Speech recognition module 316 may receive noise suppression information to assist with speech recognition. Providing noise suppression information to speech recognition module 316 is discussed in more detail below with respect to FIG. 6.

Speech recognition is automatically performed based on the noise suppression information at step 470. The speech recognition process may be optimized based on the noise suppression information. Performing speech recognition based on noise suppression information may include modulating a bit rate of a speech encoder or decoder based on a speech to noise ratio for a particular frame. In some embodiments, the bit rate is decreased when the speech to noise ratio is large. In some embodiments, speech recognition based on noise suppression may include setting a node search depth level by a speech recognition module based on a speech to noise ratio for a current frame. The node search depth level, for example, may be decreased when the speech to noise ratio is large.

Figure 5:
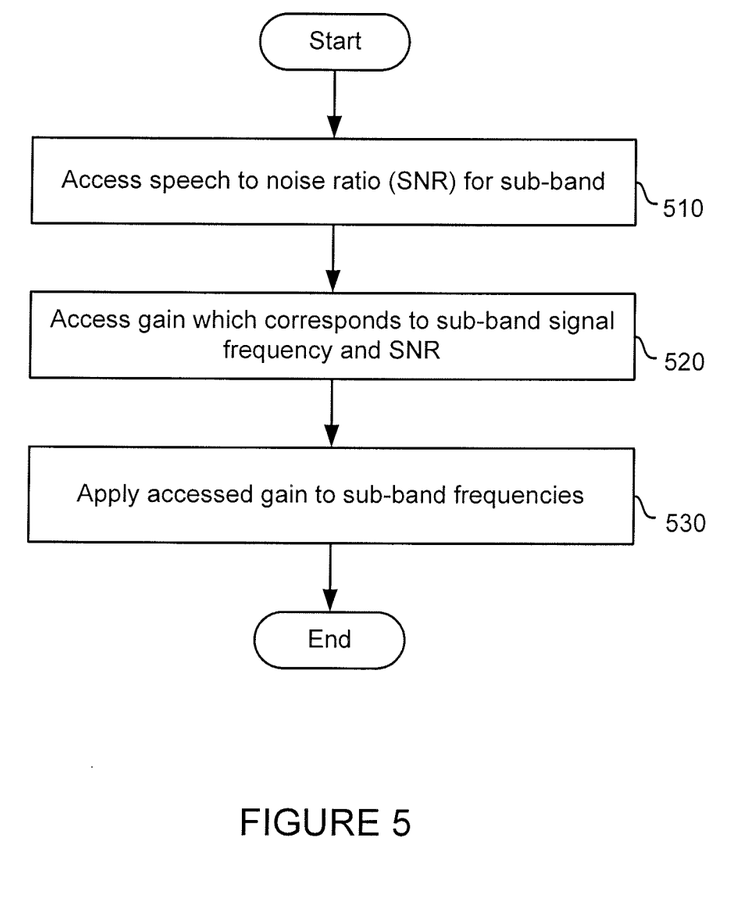
FIG. 5 is a flow chart of an exemplary method for performing noise suppression on a sub band signal.

FIG. 5 is a flow chart of an exemplary method for performing noise suppression on a sub band signal. The method of FIG. 5 provides more detail for step 450 in the method of FIG. 4. A speech to noise ratio (SNR) for a sub band is accessed at step 510. The SNR may be received by mask selector 308 from source inference engine 306. Mask selector 308 also has access to sub band information for the sub band being considered.

A gain which corresponds to the sub band signal frequency and the signal of the noise ratio is accessed at step 520. The gain is accessed by mask selector 308 from gain data store 307 and may correspond to a particular sub band signal frequency and SNR. The accessed gain is then applied to one or more sub band frequencies at step 530. The accessed gain may be provided to modifier 312 which then applies the gain to a sub band which may or may not be have undergone noise cancellation.

Figure 6:
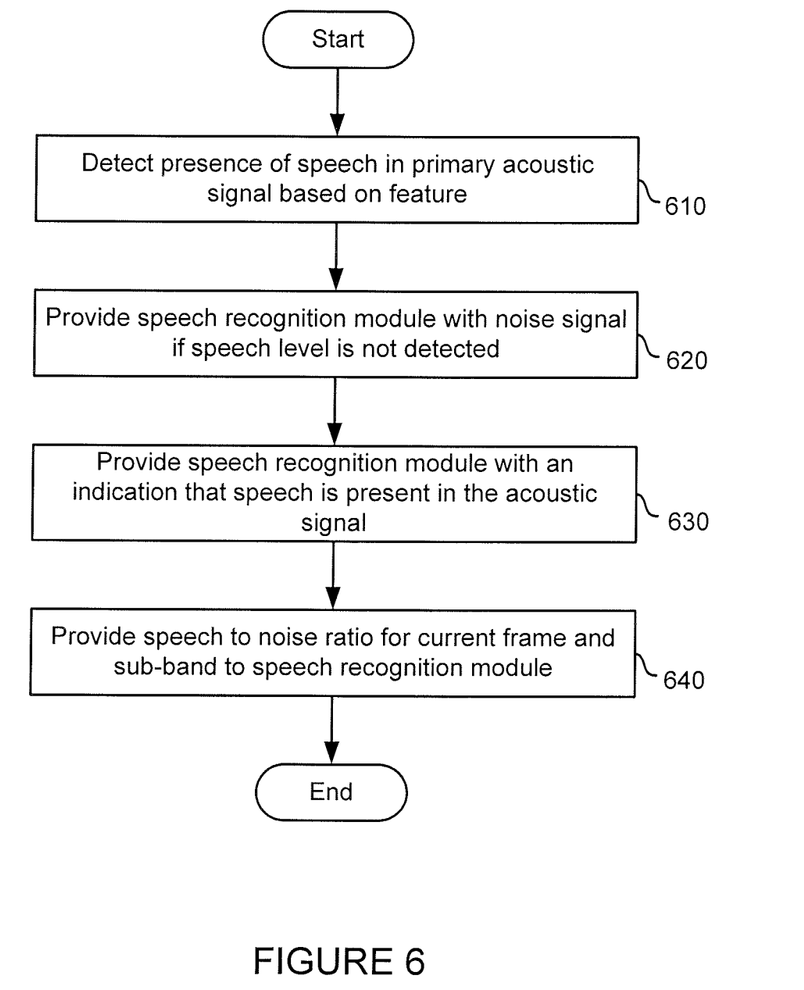
FIG. 6 is a flow chart of an exemplary method for providing noise suppression information to a speech recognition module.

FIG. 6 is a flow chart of an exemplary method for providing noise suppression information to a speech recognition module. The method of FIG. 6 may provide more detail for step 460 than the method of FIG. 4. A determination as to whether speech is detected in a primary acoustic signal based on one or more features is performed at step 610. The detection may include detecting whether speech is or is not present within the signal within the current frame. In some embodiments, an SNR for the current sub band or for all sub bands may be compared to a threshold level. If the SNR is above the threshold value, then speech may be detected to be present in the primary acoustic signal. If the SNR is not above the threshold value, then speech may be determined to not be present in the current frame.

Each of steps 620-640 describe how speech recognition may be optimized based on noise suppression or noise suppression information and may be performed in combination or separately. Hence, in some embodiments, only one of step 620-640 may be performed. In some embodiments, more than just one of steps 620-640 may be performed when providing noise suppression information to a speech recognition module.

A speech recognition module is provided with a noise signal if a speech is not detected in a current frame of a signal at step 620. For example, if the determination is made that speech is not present in the current frame of a reconstructed signal, a noise signal is provided to acoustic speech recognition module 316 in order to ensure that no false positive for speech detection occurs. The noise signal may be any type of signal that has a high likelihood of not being mistaken for speech by the speech recognition module.

A speech recognition module may be provided with an indication that speech is present in the acoustic signal at step 630. In this case, automatic speech recognition module 316 may be provided with a VAD signal provided by source inference engine 306. The VAD signal may indicate whether or not speech is present in the signal provided to automatic speech recognition module 316. Automatic speech recognition module 316 may use the VAD signal to determine whether or not to perform speech recognition on the signal.

A speech to noise ratio (SNR) signal may be provided for the current frame and/or sub band to the speech recognition module at step 640. In this case, the SNR may provide a value within a range of values indicating whether or not speech is present. This may help the automatic speech recognition module learn when to expend resources to recognize speech and when not to.

The above described modules, including those discussed with respect to FIG. 3, may include instructions stored in a storage media such as a machine readable medium (e.g., computer readable medium). These instructions may be retrieved and executed by the processor 202 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for processing an audio signal, comprising:
generating sub-band signals from a received primary acoustic signal and a received secondary acoustic signal;
determining two or more features for the sub-band signals, the two or more features including a speech energy level for the sub-band noise level and at least one of the following: inter-microphone level differences, inter-microphone time differences, and inter-microphone phase differences between the primary acoustic signal and the secondary acoustic signal;
suppressing a noise component in the primary acoustic signal based on the two or more features, the suppressing configured to clean the primary acoustic signal to create a cleaned speech signal optimized for accurate speech recognition processing by an automatic speech recognition processing module, the suppressing comprising:
applying a gain to a sub-band of the primary acoustic signal to provide a noise suppressed signal, the applying comprising:
determining a speech to noise ratio (SNR) for the sub-band of the primary acoustic signal;
accessing the gain, based on the frequency of the sub-band and the determined SNR for the sub-band, from a datastore, the datastore including a plurality of pre-stored gains configured to create cleaned speech signals optimized for accurate speech recognition processing by the automatic speech recognition processing module, each pre-stored gain in the plurality of pre-stored gains associated with a corresponding frequency and an SNR value; and
applying the accessed gain to the sub-band frequency; and providing the cleaned speech signal and corresponding noise suppression information to the automatic speech recognition processing module, the noise suppression information based on the two or more features and including a voice activity detection signal.

2. The method of claim 1, further comprising determining whether the primary acoustic signal includes speech, the determination performed based on the two or more features.

3. The method of claim 2, further comprising providing a noise signal to the automatic speech recognition processing module in response to detecting that the primary acoustic signal does not include speech.

4. The method of claim 2, wherein the voice activity detection signal is generated based on the determination of whether the primary acoustic signal includes speech, and the voice activity detection signal indicating whether automatic speech recognition is to occur.

5. The method of claim 4, wherein the voice activity detection signal is a value within a range of values corresponding to the level of speech detected in the primary acoustic signal.

6. The method of claim 2, wherein the noise suppression information includes a speech to noise ratio for the current time frame and the sub-band to the automatic speech recognition processing module.

7. The method of claim 1, wherein the noise suppression information includes a speech to noise ratio, the method further comprising modulating a bit rate of a speech encoder or decoder based on the speech to noise ratio for a particular frame.

8. The method of claim 1, wherein the noise suppression information includes a speech to noise ratio, the method further comprising setting a node search depth level by the automatic speech recognition processing module based on the speech to noise ratio for a current frame.

9. A non-transitory computer readable storage medium having embodied thereon a program, the program being executable by a processor to perform a method for reducing noise in an audio signal, the method comprising:
generating sub-band signals from a received primary acoustic signal and a received secondary acoustic signal;
determining two or more features for a sub-band signal, the two or more features including a speech energy level for the sub-band noise level and at least one of the following: inter-microphone level differences, inter-microphone time differences, and inter-microphone phase differences between the primary acoustic signal and the secondary acoustic signal;
suppressing a noise component in the primary acoustic signal based on the two or more features, the suppressing configured to clean the primary acoustic signal to create a cleaned speech signal optimized for accurate speech recognition processing by an automatic speech recognition processing module, the suppressing comprising:
applying a gain to a sub-band of the primary acoustic signal to provide a noise suppressed signal, the applying comprising:
determining a speech to noise ratio (SNR) for the sub-band of the primary acoustic signal;
accessing the gain, based on the frequency of the sub-band and the determined SNR for the sub-band, from a datastore, the datastore including a plurality of pre-stored gains configured to create cleaned speech signals optimized for accurate speech recognition processing by the automatic speech recognition processing module, each pre-stored gain in the plurality of pre-stored gains associated with a corresponding frequency and an SNR value; and
applying the accessed gain to the sub-band frequency; and
providing the cleaned speech signal and corresponding noise suppression information to the automatic speech recognition processing module, the noise suppression information based on the two or more features and including a speech to noise ratio for each of the sub-band signals and a voice activity detection signal.

10. The non-transitory computer readable storage medium of claim 9, further comprising providing a noise signal to the automatic speech recognition processing module in response to detecting that the primary acoustic signal does not include speech.

11. The non-transitory computer readable storage medium of claim 9, wherein the voice activity detection signal is generated based on the determination of whether the primary acoustic signal includes speech, and the voice activity detection signal indicating whether automatic speech recognition is to occur.

12. The non-transitory computer readable storage medium of claim 9, wherein the noise suppression information includes a speech to noise ratio for the current time frame and the sub-band to the automatic speech recognition processing module.

13. The non-transitory computer readable storage medium of claim 9, wherein the noise suppression information includes a speech to noise ratio, the method further comprising modulating a bit rate of a speech encoder or decoder based on the speech to noise ratio for a particular frame.

14. The non-transitory computer readable storage medium of claim 9, wherein the noise suppression information includes a speech to noise ratio, the method further comprising setting a node search depth level by the automatic speech recognition processing module based on the speech to noise ratio for a current frame.

* * * * *